United States Patent
Perrin

(10) Patent No.: US 8,875,495 B2
(45) Date of Patent: Nov. 4, 2014

(54) TANK ASSEMBLY AND METHOD

(75) Inventor: James M. Perrin, Livonia, MI (US)

(73) Assignee: GM Global Technology Operations LLC, Detroit, MI (US)

(*) Notice: Subject to any disclaimer, the term of this patent is extended or adjusted under 35 U.S.C. 154(b) by 422 days.

(21) Appl. No.: 12/851,768

(22) Filed: Aug. 6, 2010

(65) Prior Publication Data

US 2012/0031084 A1 Feb. 9, 2012

(51) Int. Cl.
*F01N 3/00* (2006.01)
*B60K 15/06* (2006.01)
*G01F 23/24* (2006.01)

(52) U.S. Cl.
CPC ............ *G01F 23/246* (2013.01); *B60K 15/061* (2013.01)
USPC ................ 60/295; 60/286; 392/441; 392/447

(58) Field of Classification Search
USPC ............ 60/286, 297, 301, 295, 303; 392/441, 392/444, 447, 448, 449
See application file for complete search history.

(56) References Cited

U.S. PATENT DOCUMENTS

| 4,684,786 | A * | 8/1987 | Mann et al. ................... 392/441 |
| 8,301,020 | B2 * | 10/2012 | Wildegger .................... 392/479 |
| 8,680,437 | B2 * | 3/2014 | Starck ........................... 219/205 |
| 8,689,625 | B2 * | 4/2014 | Burkart et al. ................. 73/295 |
| 2005/0028587 | A1 * | 2/2005 | Baer et al. ................. 73/204.26 |
| 2008/0256937 | A1 * | 10/2008 | Suzuki ............................ 60/300 |
| 2008/0260597 | A1 * | 10/2008 | Suzuki et al. ................. 422/148 |
| 2009/0065508 | A1 * | 3/2009 | Haeberer et al. ............. 220/562 |
| 2010/0050603 | A1 * | 3/2010 | Seino et al. ...................... 60/282 |
| 2010/0050606 | A1 * | 3/2010 | Fulks et al. ...................... 60/286 |
| 2010/0078426 | A1 * | 4/2010 | Li et al. .......................... 219/600 |
| 2010/0115925 | A1 * | 5/2010 | Charbonneau .................. 60/286 |
| 2010/0134120 | A1 * | 6/2010 | Barcin et al. .................. 324/537 |
| 2010/0236243 | A1 * | 9/2010 | Lolas et al. ..................... 60/689 |
| 2011/0138787 | A1 * | 6/2011 | Radillo et al. ................. 60/295 |
| 2011/0138790 | A1 * | 6/2011 | Radillo et al. ................. 60/303 |
| 2011/0138791 | A1 * | 6/2011 | Li et al. .......................... 60/303 |
| 2011/0210836 | A1 * | 9/2011 | Baumeister .................. 340/438 |
| 2011/0283677 | A1 * | 11/2011 | Kaefer ............................ 60/274 |
| 2012/0186334 | A1 * | 7/2012 | Steinhauser et al. ......... 73/61.76 |
| 2012/0237414 | A1 * | 9/2012 | Haeberer ...................... 422/310 |
| 2013/0340409 | A1 * | 12/2013 | Hodgson et al. ................ 60/274 |

FOREIGN PATENT DOCUMENTS

| CN | 1938569 A | | 3/2007 | |
| DE | 102007055032 A1 * | | 5/2009 | ............. F01N 3/20 |
| DE | 102008012900 A1 * | | 9/2009 | ............. G01F 23/22 |
| JP | 2005283201 A * | | 10/2005 | ............. G01F 23/00 |

OTHER PUBLICATIONS

NPL of DE 102008012900, Machine Translated on Feb. 20, 2013.*

* cited by examiner

*Primary Examiner* — Thomas Denion
*Assistant Examiner* — Patrick Maines
(74) *Attorney, Agent, or Firm* — Quinn Law Group, PLLC

(57) ABSTRACT

A tank assembly includes a tank defining a chamber that is configured to store a selectively variable volume of liquid. A positive temperature coefficient heater is disposed within the chamber. A source of electrical energy is in selective electrical communication with the heater and is configured to transfer electrical current to the heater. A controller is operatively connected to the heater and is configured to monitor the amount of electrical current to the heater. The controller is programmed to determine the volume of liquid in the chamber based on the amount of current transferred to the heater.

14 Claims, 2 Drawing Sheets

TANK ASSEMBLY AND METHOD

TECHNICAL FIELD

This invention relates to devices for measuring the amount of liquid in a tank.

BACKGROUND

Vehicles include tanks for storing liquids, such as fuel or reductant for use in a selective catalytic reduction system. The tanks are typically not accessible by a driver of the vehicle, and, accordingly, sensors are employed to determine the amount of liquid remaining in the tank. The sensors are operatively connected to gauges that are readable by the driver in the passenger compartment. Sensors often use floats that exhibit buoyancy in the stored liquid; accordingly, the amount of liquid in the tank is determined by the height of the float.

SUMMARY

A tank assembly includes a tank defining a chamber that is configured to store a selectively variable volume of liquid. A positive temperature coefficient heater is disposed within the chamber. A source of electrical energy is in selective electrical communication with the heater and is configured to transfer electrical current to the heater. A controller is operatively connected to the heater and is configured to monitor the amount of electrical current to the heater. The controller is programmed to determine the volume of liquid in the chamber based on the amount of current transferred to the heater.

The above features and advantages and other features and advantages of the present invention are readily apparent from the following detailed description of the best modes for carrying out the invention when taken in connection with the accompanying drawings.

DETAILED DESCRIPTION

Figure 1:
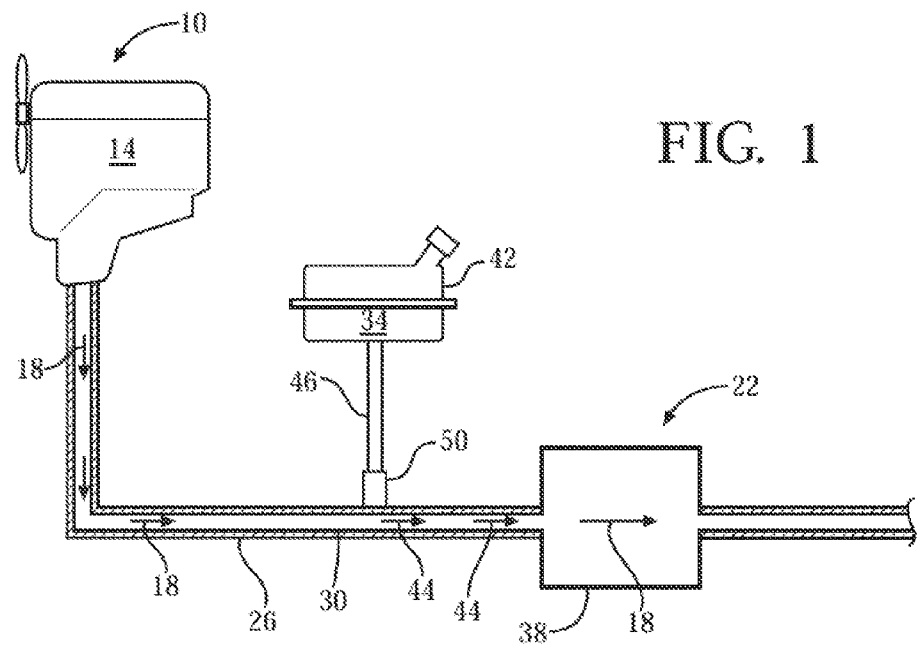
FIG. 1 is a schematic view of a powertrain including a tank for storing liquid reductant.

Referring to FIG. 1, a vehicle powertrain 10 includes a compression ignition engine 14 that generates exhaust gas 18 during operation. The powertrain 10 also includes an exhaust system 22 configured to convey the exhaust gas 18 from the engine 14 and to modify the chemical composition of the exhaust gas. The exhaust system 22 includes an exhaust conduit 26 that defines a passage 30. The exhaust system 22 further includes a selective catalytic reduction (SCR) system 34, which includes an SCR catalyst 38. Passage 30 provides fluid communication between the engine 14 and the SCR catalyst 38 such that the conduit 26 conveys exhaust gas 18 from the engine 14 to the SCR catalyst 38.

The SCR system 34 includes a tank 42 for storing a reductant 44, such as urea. A conduit 46 and an injector 50 provide fluid communication from the tank 42 to the passage 30 of exhaust conduit 26. The injector 50 is configured to inject reductant 44 from the tank 42 into the passage 30 upstream of the SCR catalyst 38. A pump (not shown) may be employed to transmit reductant 44 from the tank 42 to the injector 50.

Figure 2:
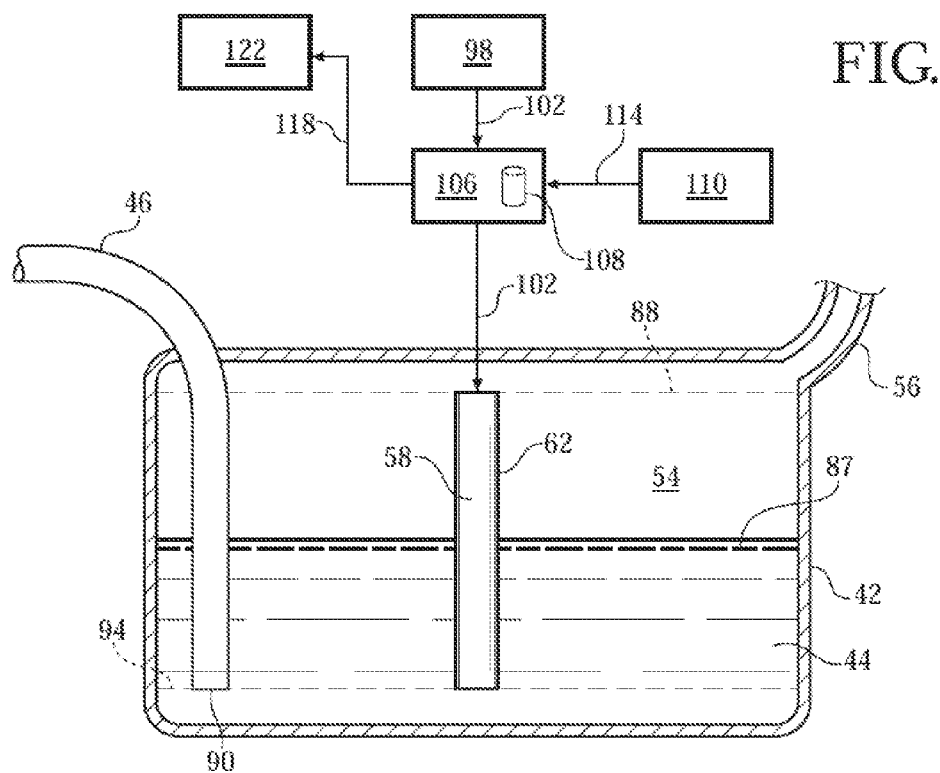
FIG. 2 is a schematic, cross-sectional view of the tank of FIG. 1, including a positive thermal coefficient heater.
Figure 3:
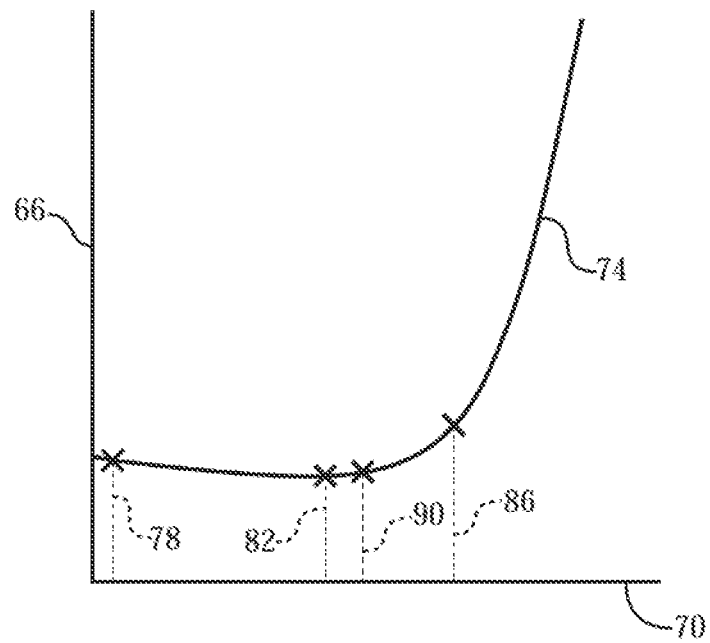
FIG. 3 is a graph depicting the relationship between electrical resistance and temperature of the material comprising the heater of FIG. 2.

Referring to FIG. 2, wherein like reference numbers refer to like components from FIG. 1, the tank 42 defines a chamber 54 for storing the reductant 44. A filler tube 56 is operatively connected to the tank 42 and is in fluid communication with the chamber 54 for adding reductant 44 to the chamber 54, such as via a nozzle (not shown). A positive temperature coefficient (PTC) heater 58 is disposed within the chamber 54. The PTC heater 58 is used to thaw the reductant 44 in the event that the reductant 44 in the chamber 54 freezes. A PTC heater includes one or more heating elements comprising a material 62 characterized by a positive temperature coefficient, such as polycrystalline barium titanate. More specifically, and with reference to FIG. 3, the electrical resistance of the material 62 is represented by the vertical axis 66, and the temperature of the material 62 is represented by the horizontal axis 70. The relationship between the electrical resistance of the material 62 and the temperature of the material 62 is represented by line 74.

At low temperatures, such as temperature 78, the application of an electrical voltage across the material 62 will cause electrical current to flow through the material 62, which will result in joule heating (electrical resistance heating) of the material 62. The joule heating of the material 62 increases the temperature of the material 62, which, between temperatures 78 and 82, causes the resistance of the material 62 to decrease, which results in more current flow and faster heating of the material 62. Thus, between temperatures 78 and 82, the electrical resistance of material 62 decreases with increasing temperature.

Between temperatures 82 and 86, the electrical resistance of material 62 gradually increases with increasing temperature. Accordingly, minimum resistance of the material 62 occurs at temperature 82. At about temperature 86, the resistance of the material increases sharply with increasing temperature, with a corresponding decrease in the amount of current flowing through the material, assuming the voltage across the material 62 remains constant. The reduced current causes reduced joule heating, and thus the temperature of the material 62 is self-regulating.

More specifically, once the material 62 reaches temperature 86 (the "switching temperature"), the material 62 will remain at temperature 86, because heat transfer to the environment will result in lower electrical resistance of material 62, with a corresponding increase in current flow through material 62, with a resultant increase in joule heating of the material 62. When the temperature of the material 62 exceeds temperature 86, then the resistance of material 62 will increase, with a corresponding reduction in current flowing therethrough and a reduction in joule heating. In the present embodiment, the typical operating range of temperatures is between temperature 90, which is higher than the temperature 82, and temperature 86. In one embodiment, the switching temperature 86 is 45° C.

Referring again to FIG. 2, liquid reductant 44 may be added to the chamber 54 via filler tube 56 until the upper surface 87 of the liquid reductant 44 in the chamber 54 reaches a maximum level 88. The maximum fill level 88 may, for example, be the level at which the tank causes the nozzle or the pump delivering the reductant via tube 56 to automatically shut off, as understood by those skilled in the art. In the embodiment depicted, the maximum fill level 88 is less than the upper extent of the chamber 54 to accommodate volumetric expansion of the reductant 44. When the upper surface 87 reaches level 88, the chamber 54 contains a maximum operating volume of liquid reductant 44. Alternatively, and within the scope of the claimed invention, the maximum level 88 may be the uppermost extend of the chamber 54.

The inlet 90 of conduit 46 is disposed within the chamber 54 at level 94. During operation of the engine (shown at 14 in FIG. 1), the reductant 44 in the chamber 54 is drawn into the inlet 90 and conveyed via conduit 46 and the injector 50 to the exhaust conduit 26. As reductant is drawn out of the chamber 54 via the inlet 90, the volume of reductant 44 in the chamber 54 is reduced, and the level of the reductant 44 in the chamber 54 is lowered until the level of reductant 44 (i.e., the surface 87) reaches level 94. If the level of the reductant 44 goes below level 94, then the reductant is below the inlet 90 and cannot be pumped out of the chamber 54 through the inlet 90. Accordingly, when the upper surface 87 of the reductant 44 is at level 94, the chamber 54 contains a minimum operating volume of liquid reductant 44. Level 94 may therefore be considered a minimum level of reductant 44. Alternatively, and within the scope of the claimed invention, the minimum level may be the lowermost extent of the chamber 54.

The heater 58 and material 62 extend vertically in the chamber from the minimum level 90 to the maximum level 88, and are configured to heat the reductant 44 to a desired operating temperature. More specifically, an electrical energy source, such as a battery 98 is operatively connected to the heater 58 to transmit electrical current 102 thereto. In the embodiment depicted, the battery 98 transmits the current 102 to the heater 58 via an electronic controller 106, which is configured to selectively control the electronic communication between the battery 98 and the heater 58. The controller 106 is also configured to detect or determine the amount of electrical current 102 flowing to the heater 58. The controller 106 in one embodiment is a glow plug control module for the engine 14, but may be any type of controller within the scope of the claimed invention.

The controller 106 is configured and programmed to determine the level of liquid reductant 44 in the tank 42 based on the amount of current being drawn by, or transferred to, the heater 58. When the PTC heater 58 is exposed to liquid reductant 44, the heater 58 transfers heat to the liquid reductant 44 via conduction. When the PTC heater 58 is exposed to air or other gases, the heater 58 transfers heat to the air or other gases via convection. Conduction is a more efficient mode of heat transfer than convection, and the specific heat of liquid reductant is higher than the specific heat of air and other gases. Thus, regions of the PTC heater 58 exposed to air above the level of surface 87 will draw less current 102 than regions of the heater 58 exposed to liquid reductant below the level of surface 87. Accordingly, the amount of electrical current drawn by the heater 58 is indicative of the level of surface 87 and, thus, is indicative of the total volume of liquid reductant 44 in the tank 42. Assuming all other factors (such as voltage applied and ambient temperature) are equal, a higher amount of current drawn by the heater 58 indicates a higher volume of liquid reductant 44 in the tank 42 than a lower amount of current.

In the embodiment depicted, the controller 106 includes a data storage medium 108 having a database stored thereon. A temperature sensor 110 is operatively connected to the controller 106 and is configured to transmit sensor signals 114 thereto. The temperature sensor 110 is configured to measure ambient atmospheric temperature or the temperature of the liquid reductant 44 inside the tank. Sensor signals 114 are indicative of the ambient atmospheric temperature or the temperature of the liquid reductant 44 inside the tank.

The controller 106 is programmed and configured to determine the level of liquid reductant 44 in the tank, and therefore determine the volume of liquid reductant in the tank, based on the amount of current 102 being drawn by the heater 58. More specifically, in the embodiment depicted, the database stored in the storage medium 108 includes a lookup table that provides, for each of a plurality of current amounts, a corresponding reductant level in the tank. The controller 106 accesses the database to determine the liquid reductant level that corresponds to the amount of current 102 being drawn by the heater 58. The controller may interpolate or extrapolate values in the lookup table if, for example, the amount of current drawn by the heater 58 is between or outside of values provided in the lookup table. The controller 106 in the embodiment depicted also uses signal 114 to provide a correction factor to the value provided from the lookup table, and thus the controller 106 also determines the volume of liquid reductant 44 based on the sensor signals 114.

The controller 106 then transmits a signal 118 that is indicative of the level or volume of liquid reductant in the tank to an output device 122. The output device 122 is configured to communicate to a user of the powertrain the volume of fluid in the tank based on signal 118. The output device 122 may, for example, be an analogue gauge, a liquid-crystal display, an audio device, etc.

In the embodiment depicted, the heater 58 extends from the minimum level 94 of reductant 44 to the maximum level 88 of reductant 44. However, and within the scope of the claimed invention, the heater 58 may extend only a portion of the distance between the minimum level 94 of reductant 44 to the maximum level 88 of reductant 44.

As used in the claims, determining "the volume of liquid" includes determining information that is descriptive of the volume of liquid, such as the total volume (e.g., the number of liters of liquid), the level of the upper surface of the liquid, expressed as a percentage or fraction of the distance between level 94 and level 88, whether the level of the upper surface of the liquid is above or below a predetermined level in the chamber, etc.

It should be noted that, during engine operation when the reductant 44 is liquid (i.e., not frozen), the controller 106 may or may not continuously transfer current 102 to the heater 58 within the scope of the claimed invention. For example, the controller 106 may only occasionally transfer current 102 to the heater 58 to determine the volume of liquid in the tank at predetermined time intervals in order to reduce the amount of energy drawn from the battery 98.

While the best modes for carrying out the invention have been described in detail, those familiar with the art to which this invention relates will recognize various alternative designs and embodiments for practicing the invention within the scope of the appended claims.

The invention claimed is:

1. A tank assembly comprising:
   a tank defining a chamber that is configured to store a selectively variable volume of liquid having an upper surface that is movable between a maximum level of liquid and a minimum level of liquid inside the chamber;
   a positive temperature coefficient heater disposed within the chamber and extending from the maximum level of liquid to the minimum level of liquid, wherein the amount of the heater disposed above the upper surface increases as the liquid is drawn out of the chamber;
   a source of electrical energy in selective electrical communication with the heater and configured to transfer electrical current to the heater; and
   a controller operatively connected to the heater and configured to monitor the amount of electrical current flowing to the heater;

wherein the controller is configured to determine the volume of liquid in the chamber based on the amount of current being transferred to the heater;

wherein the heater is comprised of a material; wherein the electrical resistance of the material varies with the temperature of the material; and wherein the material is characterized by a switching temperature above which the rate of increase of electrical resistance per unit of temperature rises.

2. The tank assembly of claim 1, further comprising a temperature sensor operatively connected to the controller to transmit sensor signals thereto;

wherein the controller is configured to determine the volume of liquid in the chamber based on the amount of current transferred to the heater and the sensor signals.

3. The tank assembly of claim 1, further comprising an output device; and wherein the controller is configured to transmit a sensor signal that is indicative of the volume of liquid in the chamber to the output device.

4. The tank assembly of claim 1 wherein the electrical resistance of the material decreases within a range of temperatures of the material, with the range of temperatures being less than the switching temperature.

5. The tank assembly of claim 1 wherein the amount of current being transferred to the heater changes when the amount of the heater exposed to the liquid changes.

6. The tank assembly of claim 1 wherein a region of the heater exposed to a gas above the upper surface of the liquid draws less current than a region of the heater exposed to the liquid below the upper surface.

7. The tank assembly of claim 1 wherein a higher amount of current being drawn by the heater indicates a higher volume of liquid in the tank.

8. An engine assembly comprising:
an engine that selectively produces exhaust gas;
a catalyst;
an exhaust conduit that provides fluid communication between the engine and the catalyst;
a tank defining a chamber that is configured to selectively store a variable volume of liquid that is in fluid communication with the exhaust conduit and that has an upper surface that is movable between a maximum level of liquid and a minimum level of liquid inside the chamber;
a positive temperature coefficient heater disposed within the chamber and extending from the maximum level of liquid to the minimum level of liquid, wherein the amount of the heater disposed above the upper surface increases as the liquid is drawn out of the chamber;
a source of electrical energy in selective electrical communication with the heater and configured to transfer electrical current to the heater; and
a controller operatively connected to the heater and configured to monitor the amount of electrical current flowing to the heater;

wherein the controller is configured to determine the volume of liquid in the chamber based on the amount of current being transferred to the heater;

wherein the heater is comprised of a material; wherein the electrical resistance of the material varies with the temperature of the material; and wherein the material is characterized by a switching temperature above which the rate of increase of electrical resistance per unit of temperature rises.

9. The engine assembly of claim 8, further comprising a temperature sensor operatively connected to the controller to transmit sensor signals thereto;

wherein the controller is configured to determine the volume of liquid in the chamber based on the amount of current transferred to the heater and the sensor signals.

10. The engine assembly of claim 8, further comprising an output device; and wherein the controller is configured to transmit a sensor signal that is indicative of the volume of liquid in the chamber to the output device.

11. The engine assembly of claim 8 wherein the electrical resistance of the material decreases within a range of temperatures of the material, with the range of temperatures being less than the switching temperature.

12. The engine assembly of claim 8 wherein the amount of current being transferred to the heater changes when the amount of the heater exposed to the liquid changes.

13. The engine assembly of claim 8 wherein a region of the heater exposed to a gas above the upper surface of the liquid draws less current than a region of the heater exposed to the liquid below the upper surface.

14. The engine assembly of claim 8 wherein a higher amount of current being drawn by the heater indicates a higher volume of liquid in the tank.

* * * * *